United States Patent [19]
Salviato

[11] Patent Number: 5,950,734
[45] Date of Patent: Sep. 14, 1999

[54] CUTTING APPARATUS PARTICULARLY FOR CUTTING SODS AND REMOVING PLANTS

[75] Inventor: Tiziano Salviato, Dolo, Italy

[73] Assignee: Holmac S.a.s. Di Gastaldi Christian E C., Padova, Italy

[21] Appl. No.: 08/995,409

[22] Filed: Dec. 19, 1997

[30] Foreign Application Priority Data

Dec. 23, 1996 [IT] Italy ................................. PD96A0318

[51] Int. Cl.⁶ ........................... A01G 23/04; A01B 45/04
[52] U.S. Cl. ............................................... 172/19; 37/302
[58] Field of Search ............................. 37/301, 302, 189, 37/462, 463, 464, 465, 195; 111/101; 172/19; 30/381; 56/290, 291, 292; 299/82.1, 84.1, 102, 103, 33, 43

[56] References Cited

U.S. PATENT DOCUMENTS

| | | |
|---|---|---|
| 233,316 | 10/1880 | Beldsmeier ............................... 56/291 |
| 1,485,527 | 3/1924 | Raeber ..................................... 37/302 |
| 1,903,518 | 4/1933 | Simmons et al. . | |
| 2,410,203 | 10/1946 | Culley . | |
| 2,755,570 | 7/1956 | Blackburn et al. . | |
| 3,534,487 | 10/1970 | Arnaz . | |
| 3,643,354 | 2/1972 | Clegg . | |
| 3,831,358 | 8/1974 | Marsh et al. ............................. 56/291 |
| 4,164,835 | 8/1979 | Conte ....................................... 56/291 |

FOREIGN PATENT DOCUMENTS

| | | |
|---|---|---|
| 569291 | 4/1924 | France . |
| 13417 | 4/1901 | United Kingdom . |
| 2164604 | 3/1986 | United Kingdom . |
| 8201503 | 5/1982 | WIPO . |

*Primary Examiner*—Thomas B. Will
*Assistant Examiner*—Robert Pezzuto
*Attorney, Agent, or Firm*—Guido Modiano; Albert Josif

[57] ABSTRACT

A cutting apparatus for a vehicle, particularly for cutting sods and removing plants, comprising a transmission device which is connected by elements a power take-off coupled to a driving device. The cutting apparatus is supported by a supporting structure which is articulated to one or more axes. The cutting apparatus comprises a guiding and supporting element which is supported by the supporting structure and is shaped so that upon assembly it is arranged like a circular arc along its longitudinal extension. A plurality of sliding blocks is slidingly associated with the guiding and supporting element along its edge; the sliding blocks are mutually connected and moved by a flexible element. Each sliding block supports a corresponding cutting element which is suitable to cut and remove plants. The plurality of sliding blocks and the corresponding flexible element form a closed cutting loop which is kinematically coupled to the power take-off.

14 Claims, 5 Drawing Sheets

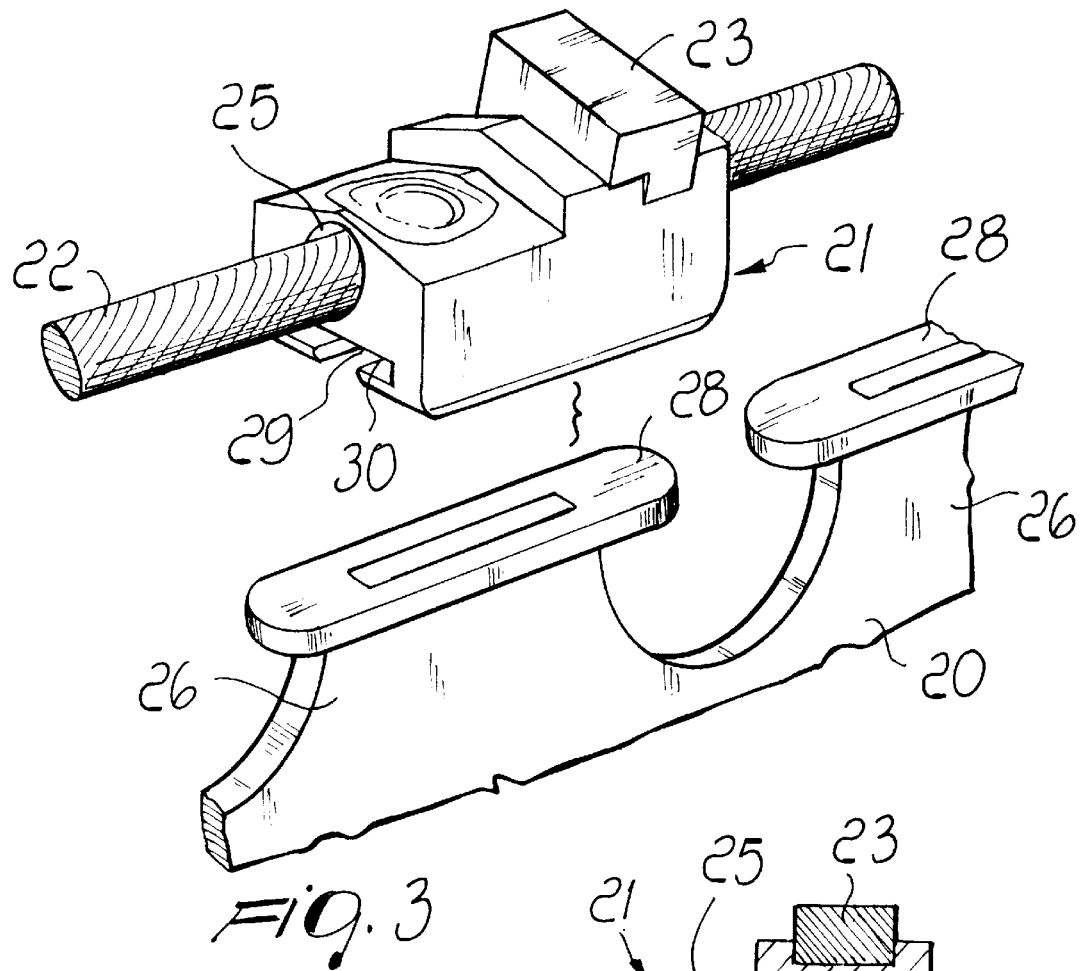
Fig. 3
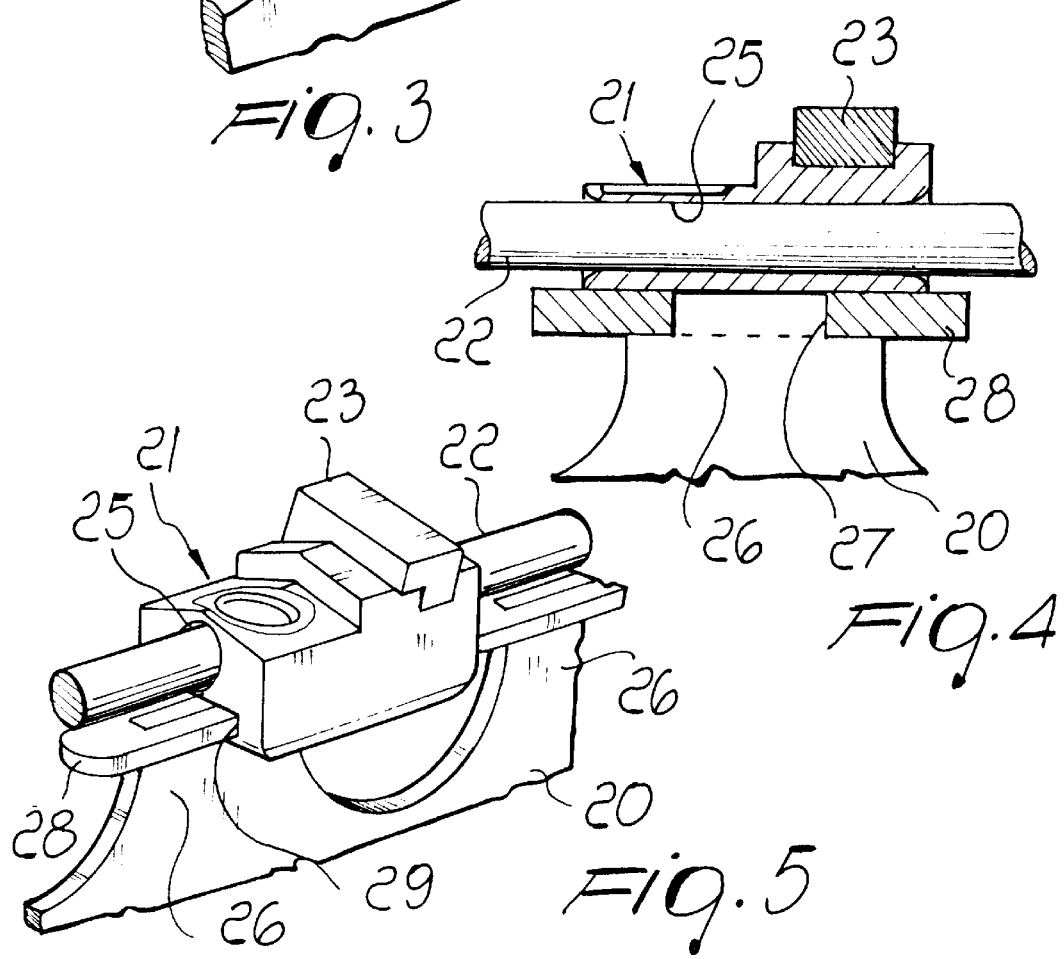
Fig. 4
Fig. 5

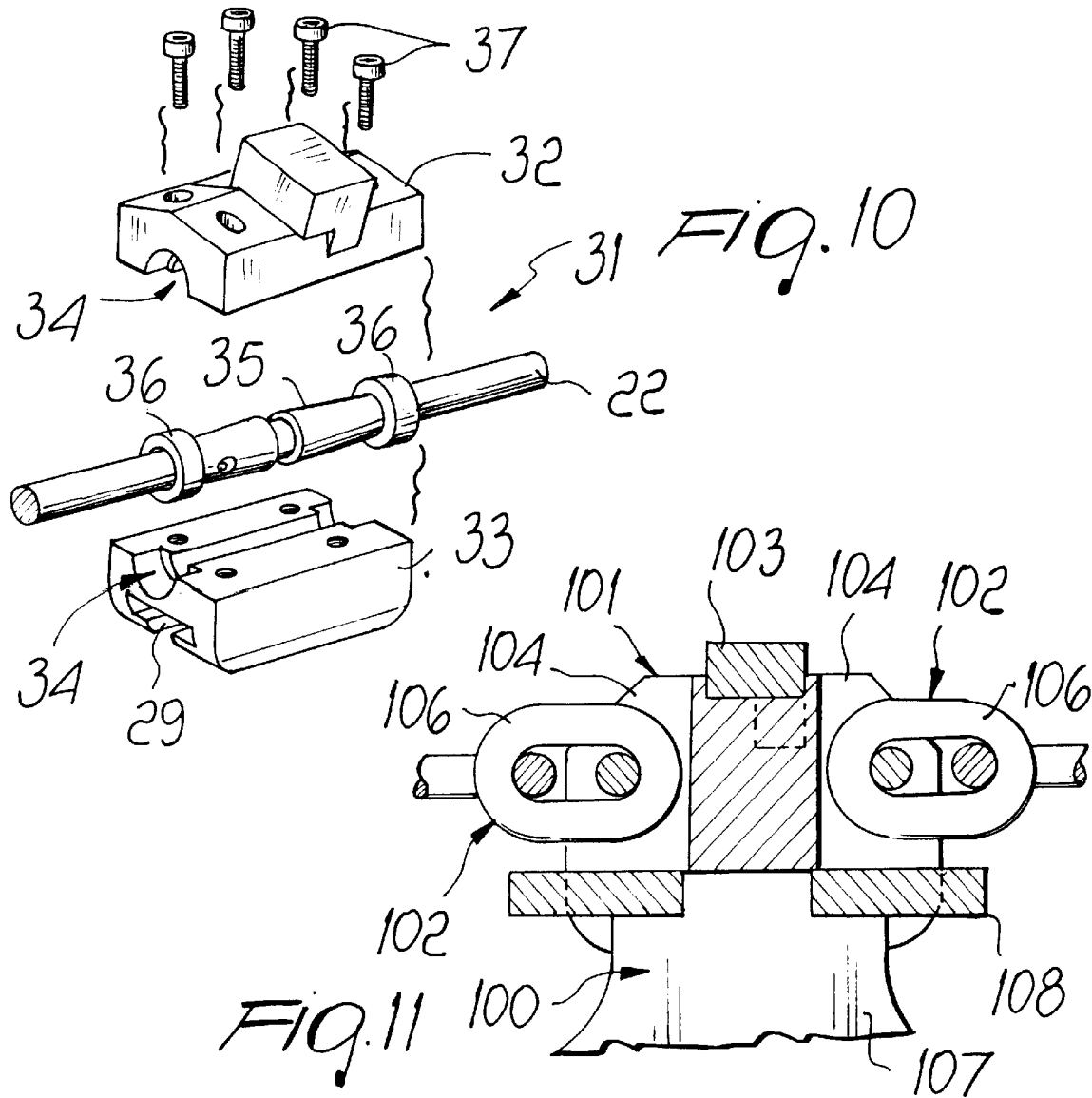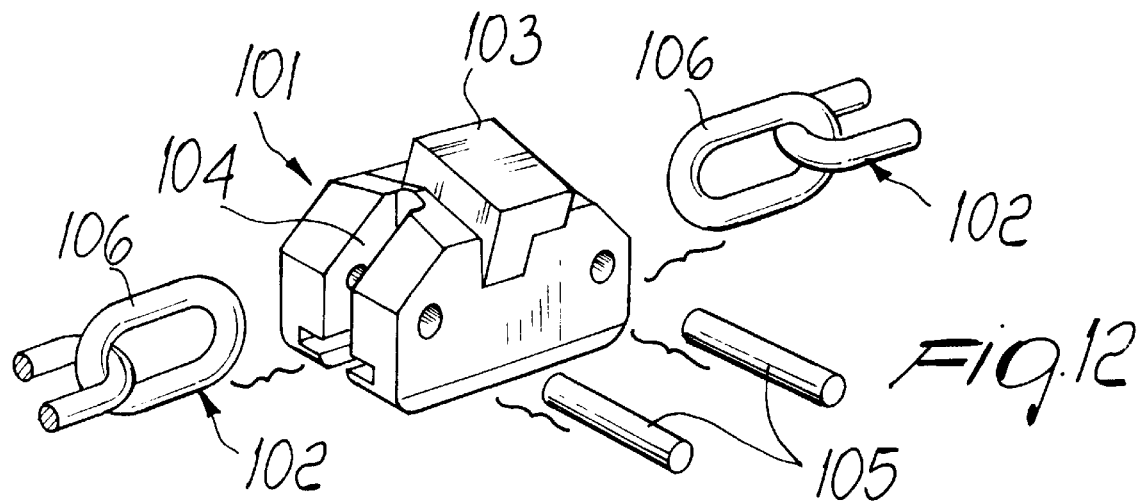

CUTTING APPARATUS PARTICULARLY FOR CUTTING SODS AND REMOVING PLANTS

BACKGROUND OF THE INVENTION

The present invention relates to an apparatus which can be associated with a vehicle particularly for cutting sods and removing plants.

In the farming and plant-nursery field, in garden-keeping and in the field of the cultivation of ornamental plants or productive crops, it is conventionally necessary to cut the sod and remove the plants without compromising their root system and ultimately their life.

Vehicles have been conceived for this purpose which obviate the long and tiring manual work required for cutting and uprooting the plants.

These vehicles substantially comprise a mobile chassis, usually with a track drive, in which a seat is provided for the operator and for means for controlling and actuating the steering and the cutting operations.

Moreover, these vehicles are provided with a cutting apparatus which is connected by means of a power take-off coupled to driving means for a rotating and vibrating blade which is usually crescent-shaped and is suitable to cut and remove trees.

The blade penetrates the ground and removes, after rotating through approximately 180 sexagesimal degrees about an axis that passes through its mutually opposite ends, a substantially hemispherical sod which contains the root system of the plant.

Although these machines perform their intended tasks, they have been found to be effective only in case of soft soil and with root systems that are not excessively developed.

When the weather conditions harden the soil and with particular plants, these machines are in fact unable to cut the sod.

Additionally, since the sods to be removed have different dimensions according to the age and type of plant, it is often necessary to replace the blades in order to optimize the operations for excavating and removing the plants.

SUMMARY OF THE INVENTION

The aim of the present invention is to provide an apparatus, particularly for cutting sods and removing plants, which can be used substantially on any kind of plant and with any soil condition, even when the soil is particularly hard owing to its nature or to weather conditions.

Within the scope of this aim, an object of the present invention is to provide an apparatus which is highly flexible in operation and equally easy to use.

Another object of the present invention is to provide an apparatus which is easily maneuverable and usable even in very rough, steep or muddy terrain.

Another object of the present invention is to provide an apparatus which does not require the operator to have particular skills for its use.

Another object of the present invention is to provide an apparatus which can be an accessory and can be applied to various vehicles, such as for example farm tractors, excavators, earth-movers or the like.

Another object of the present invention is to provide an apparatus which is durably reliable, can be manufactured with conventional technologies and in models which are flexible in terms of size and power and are suitable to meet the most disparate requirements of application.

This aim, these objects and others which will become apparent hereinafter are achieved by a cutting apparatus for a vehicle, particularly for cutting sods and removing plants, comprising transmission means which are connected by means of a power take-off coupled to driving means, said apparatus being characterized in that said cutting apparatus comprises a guiding and supporting element which is supported by a supporting structure and is shaped like a circular arc along its longitudinal extension, a plurality of sliding blocks being slidingly associated with said guiding and supporting element along its perimetric edge, said sliding blocks being mutually connected and moved by a flexible element, each sliding block supporting at least one corresponding cutting element suitable to cut and remove sods and therefore plants, said plurality of sliding blocks and the corresponding flexible element forming a closed cutting loop which is kinematically coupled to said power take-off.

BRIEF DESCRIPTION OF THE DRAWINGS

Further characteristics and advantages of the present invention will become apparent from the following detailed description of two embodiments thereof and of associated variations, illustrated only by way of non-limitative example in the accompanying drawings, wherein:

FIG. 3 is an exploded view of a detail of the apparatus of FIG. 2;

FIG. 4 is a sectional view of the detail of FIG. 3;

FIG. 5 is a perspective view of the detail of FIG. 3 during operation;

FIG. 10 is an exploded perspective view of the embodiment of FIG. 9;

FIG. 11 is a view of a detail of an apparatus according to the present invention in a second embodiment;

FIG. 12 is an exploded perspective view of the detail of FIG. 11.

DESCRIPTION OF THE PREFERRED EMBODIMENTS

Figure 1:
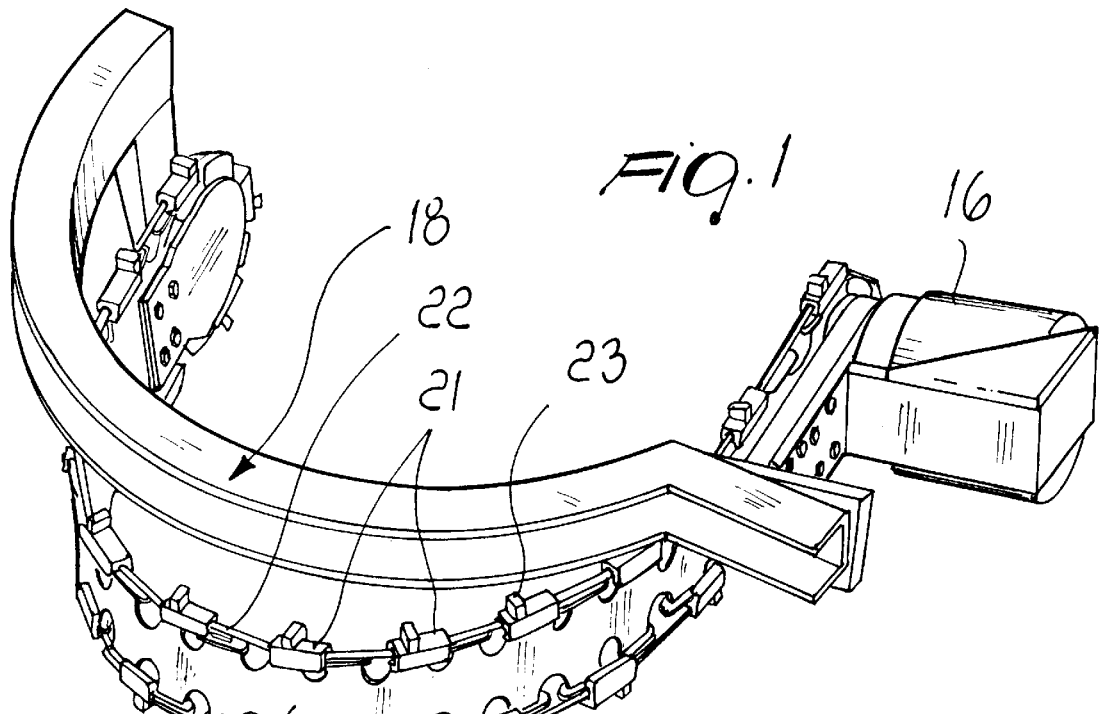
FIG. 1 is a perspective view of a detail of an apparatus according to the present invention.
Figure 2:
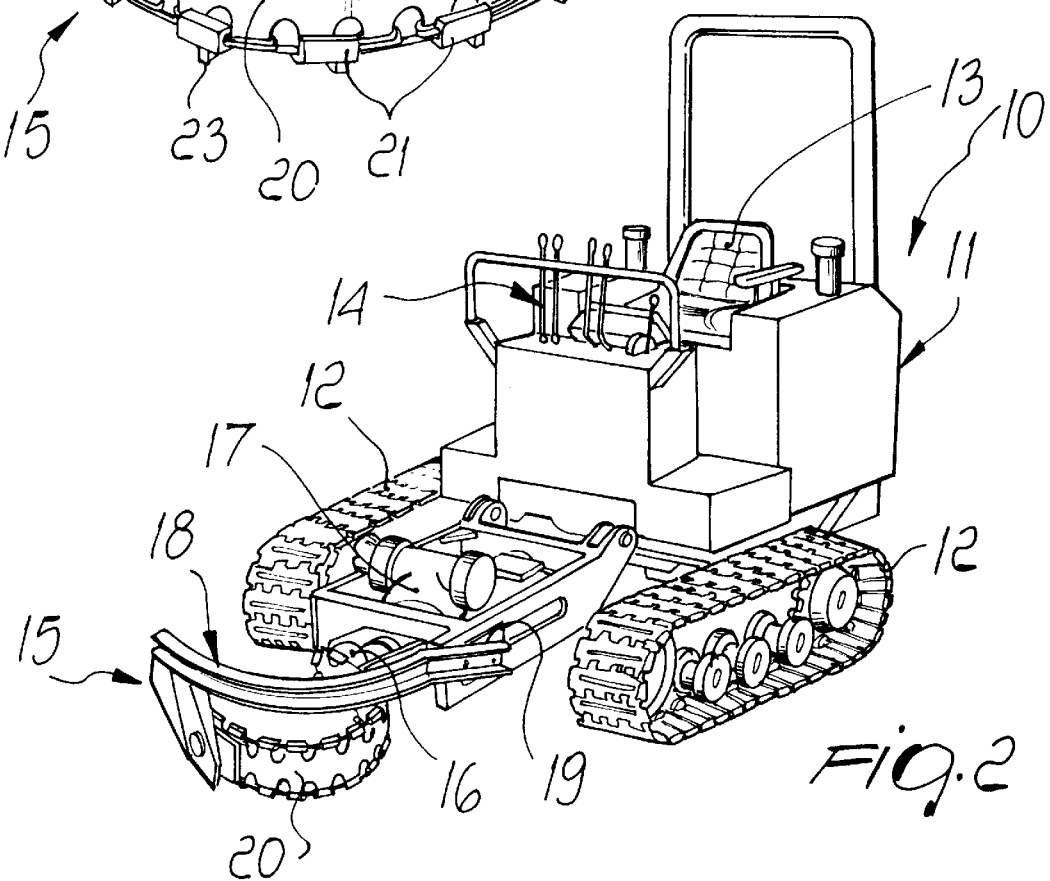
FIG. 2 is another perspective view of an apparatus according to the present invention associated with a vehicle.
Figure 6:
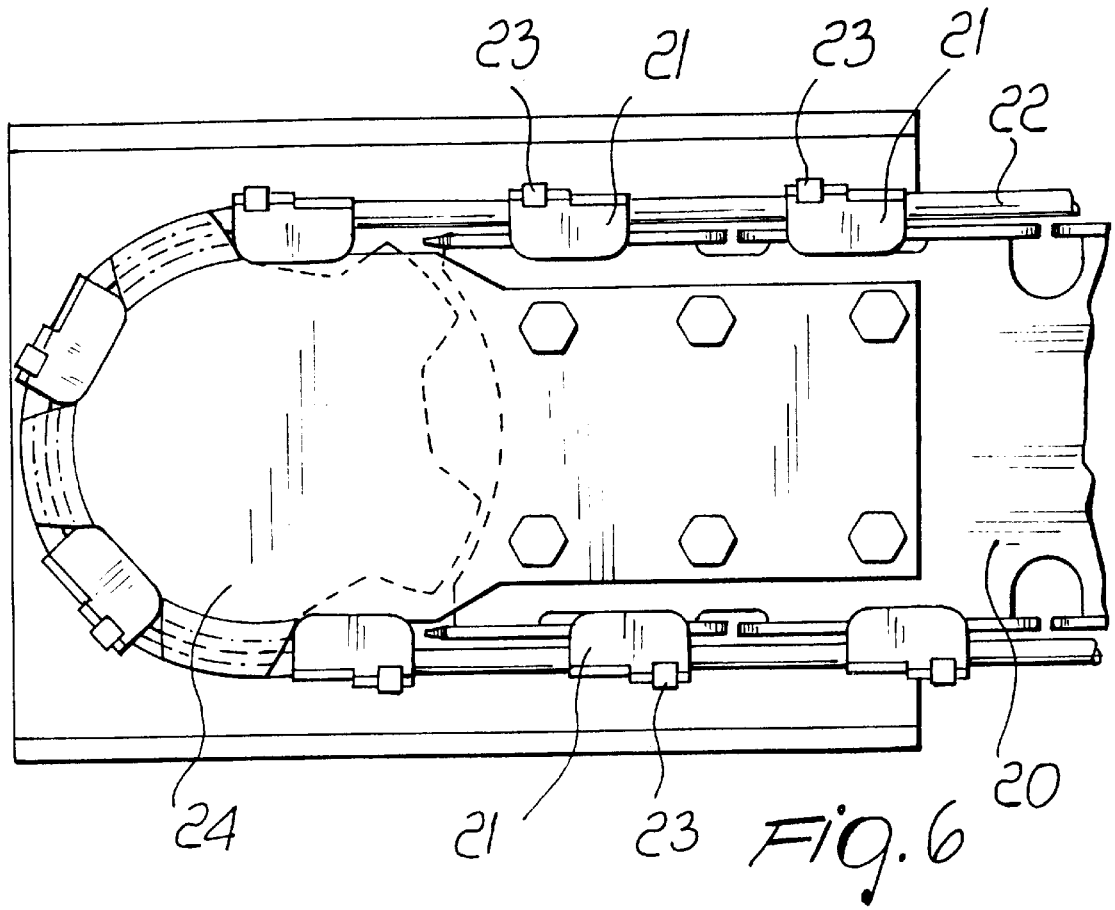
FIGS. 6 and 7 are partially sectional views of another detail of the apparatus of FIG. 2.
Figure 7:
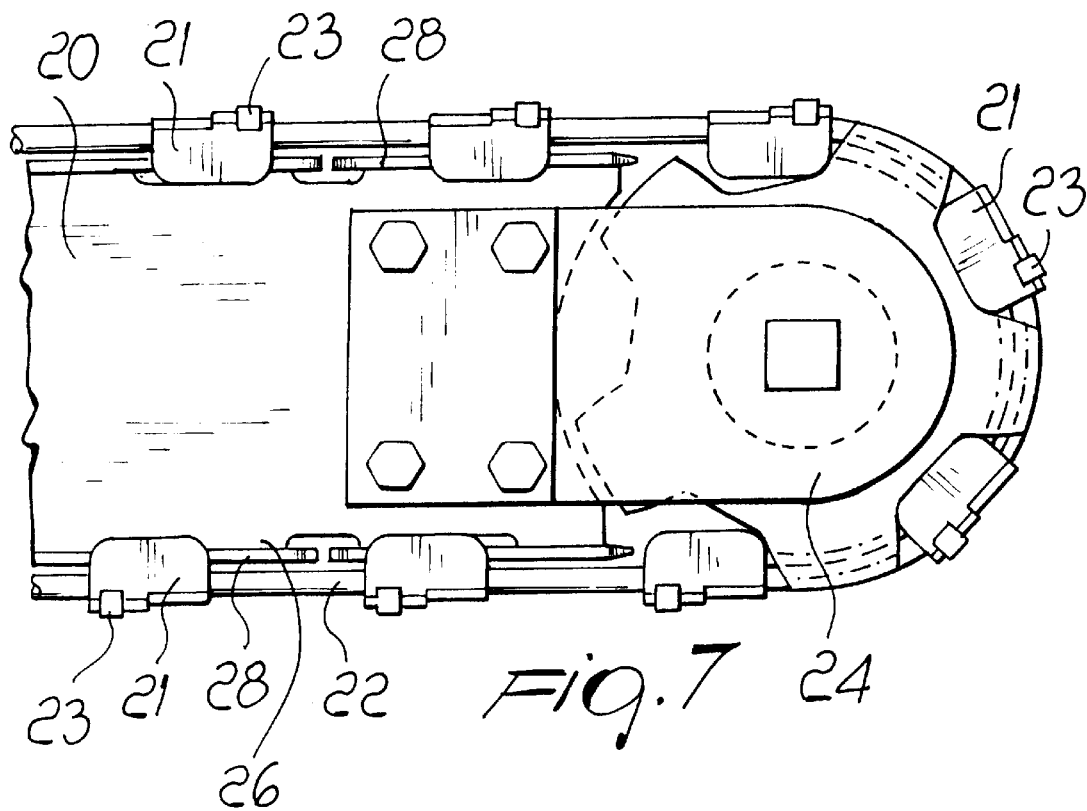
Figure 8:
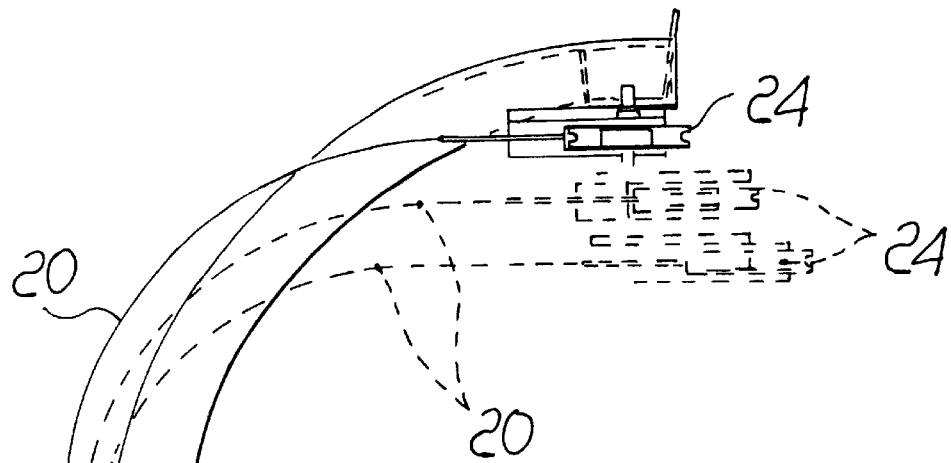
FIG. 8 is a plan view of the detail of FIG. 1.

With particular reference to FIGS. 1 to 8, a vehicle particularly for cutting sods and removing plants is generally designated by the reference numeral 10.

The vehicle 10 comprises a chassis 11 with a track drive 12, in which there is provided a seat 13 for an operator and for means, generally designated by the reference numeral 14, for controlling and actuating the steering and cutting operations.

The vehicle 10 also comprises a cutting apparatus according to the present invention, generally designated by the reference numeral 15, which in turn comprises transmission means 16 which are connected by means of a power take-off 17 coupled to driving means which are not shown.

The cutting apparatus 15 is supported by a supporting structure, generally designated by the reference numeral 18, which is articulated to a horizontal axis and a vertical axis, generally designated by the reference numeral 19.

The cutting apparatus 15 comprises a guiding and guiding and supporting element 20 which in this case is plate-shaped, is supported at its ends by the supporting structure 18, and is shaped so as to be arranged, upon assembly, in the shape of a circular arc along its longitudinal extension.

A plurality of sliding blocks 21 are slidingly associated with the guiding and supporting element 20, along its edge, and are mutually connected and moved, in this case, by a cable 22 made of metal wires.

Each sliding block 21, in this case substantially constituted by a shaped block, supports a corresponding cutting element 23 which is indeed suitable to cut and remove sods and therefore plants.

As a whole, the plurality of sliding blocks 21 and the cable 22 form a closed cutting loop which is moved by toothed pinions 24 which are rotatably coupled to the supporting structure 18; one of the pinions is also motorized by connection to the power take-off 17.

More specifically, each sliding block 21 is provided with an axial through hole 25 in which a corresponding portion of the cable 22 is inserted and keyed.

Moreover, the guiding and supporting element 20 is shaped, at its edge, so as to form a plurality of teeth 26 which are associated, by insertion in corresponding holes 27, with corresponding flat elements 28 which form flanges which, by mutual association, form the track for the sliding of the sliding blocks 21.

Each sliding block 21 also has a corresponding longitudinal slot 29 which is shaped so as to form undercuts 30 and is suitable to slidingly associate with the elements 28.

In this embodiment, the radius of the circular arc formed by the guiding element 20 can vary over a variability range and can thus provide a corresponding variability in the volume of the sod to be removed, thus limiting the need to interchange different guiding and supporting elements for different applications.

Figure 9:
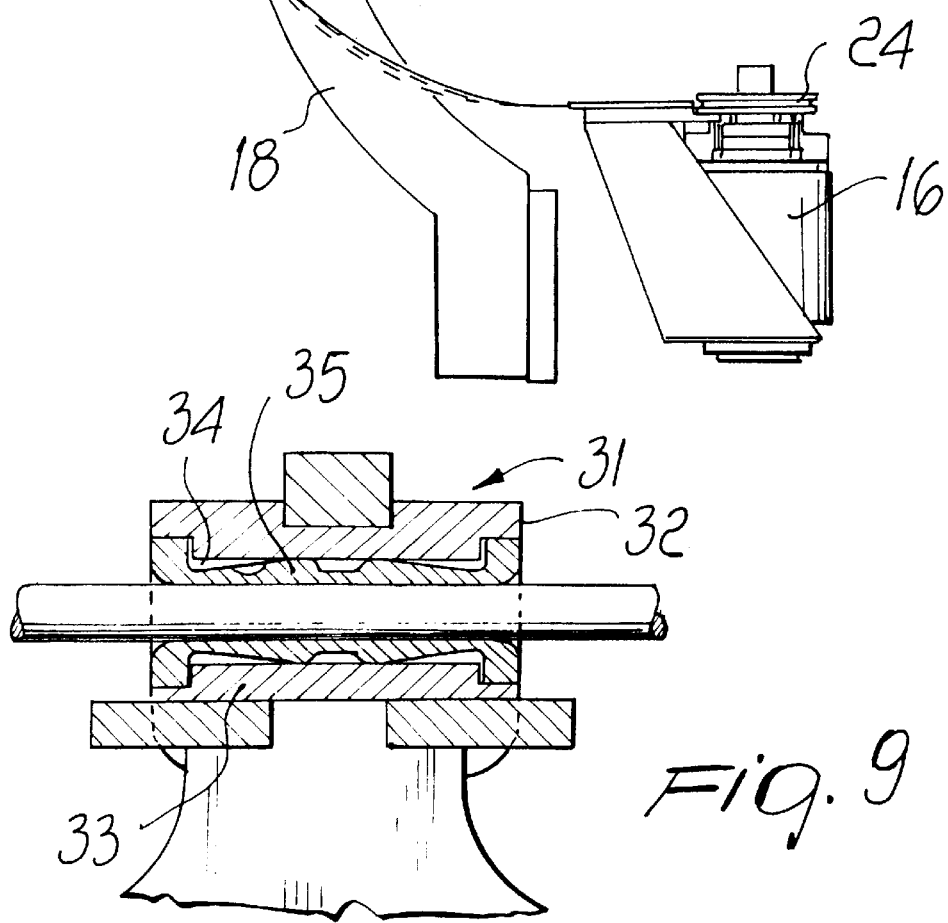
FIG. 9 is a view of a different embodiment of the detail of FIG. 3.

With particular reference to FIGS. 9 and 10, a different embodiment of the apparatus 15 is shown in which the sliding blocks 21 are substantially constituted by a composite block which is generally designated by the reference numeral 31 and is constituted by two hollow components 32 and 33 which form, by mutual association, a longitudinal seat 34 in which it is possible to accommodate a shaped tubular fixing element 35 provided with two flanges 36 at the end; upon assembly, said flanges fix said fixing element axially to the corresponding block 31.

The flanges 36 are in fact accommodated in corresponding seats formed by the components 32 and 33 by mutual association.

The tubular element 35, during assembly, is fixed by keying (in other cases by welding or equivalent means) to a corresponding segment of the cable 22.

The two components 32 and 33 are furthermore mutually associated by means of threaded elements 37.

In this embodiment, the slot 29 is formed at the component 33.

With particular reference to FIGS. 11 and 12, a second embodiment of the apparatus according to the present invention has a guiding and supporting element 100 which is supported by a supporting structure, not shown, and is shaped so as to be arranged, upon assembly, in the shape of a circular arc along its longitudinal extension.

A plurality of sliding blocks, designated by the reference numeral 101 in this case, are slidingly associated with the guiding and supporting element 100 along its edge; said sliding blocks are mutually connected and moved by chain segments 102.

Each sliding block 101 supports a corresponding cutting element 103 which is suitable to cut and remove sods and therefore plants.

The sliding blocks 101 and the corresponding flexible element are constituted in this case by the chain segments 102 and form a closed cutting loop coupled to a power take-off, which in this case is not illustrated.

Each sliding block 101 is constituted, in this case, by a shaped block on which slots 104 are formed on opposite sides along the longitudinal axis; the slots are crossed transversely by corresponding pins 105 which also enter the end links 106 of the chain segments 102 that connect it to adjacent sliding blocks 101.

In this case too, the guiding and supporting element 100 is shaped so as to form, at its edge, teeth 107 with which plate-like elements 108 are associated; said plate-like elements are suitable to form flanges which form, by mutual association, the sliding track of the sliding blocks 101.

The chain segments 102 and the corresponding sliding blocks 101 are driven by toothed pinions which are not illustrated.

In practice it has been found that the present invention has achieved the intended aim and objects.

It is in fact noted that the cutting apparatus according to the present invention can be easily used in any condition of the terrain and with extensive roots, since the active cutting action produced by the movement of the sliding blocks and therefore of the corresponding cutting elements allows to deal successfully with the resistance of the toughest root systems and even of the hardest soils.

Attention is also drawn to the operating flexibility of the apparatus according to the present invention also in terms of size, because of the possibility to adjust the width of the cut of the cutting apparatus with which it is provided.

The possibility to vary the cutting width entails a reduced need to vary and adjust the apparatus according to various applications.

Attention is also drawn to the solidity of the structure of the cutting apparatus according to the present invention, which requires limited maintenance and on which particularly quick and effective repairs can be performed in any case.

Attention is also drawn to the low operating cost of the apparatus according to the present invention, which can be used easily even in particularly difficult working conditions, such as rough, rocky, steep or muddy terrain.

The present invention is susceptible of numerous modifications and variations, all of which are within the scope of the inventive concept; thus, for example, the flexible element can move in a single direction or back and forth and it is also possible to provide means for coupling to other self-propelled units.

The details can be replaced with other technically equivalent elements.

The materials and the dimensions may be any according to requirements.

What is claimed is:

1. A cutting apparatus for a vehicle, particularly for cutting sods and removing plants, comprising transmission means which are connected by means of a power take-off coupled to driving means, wherein said cutting apparatus comprises a guiding and supporting element which is supported by a supporting structure and is shaped like a circular arc along its longitudinal extension, a plurality of sliding blocks being slidingly associated with said guiding and supporting element along its perimetric edge, said sliding blocks being mutually connected and moved by a flexible element, each sliding block supporting at least one corresponding cutting element which is suitable to cut and remove sods and therefore plants, said plurality of sliding blocks and the flexible element forming a closed cutting loop which is kinematically coupled to said power take-off, said flexible element being constituted by at least one cable;

each one of said sliding blocks being associated with said cable through the interposition of a further element which is shaped so as to form end flanges which lock it in seats formed in the corresponding sliding block.

2. The apparatus of claim 1, wherein each one of said sliding blocks is constituted by two components which can be reversibly associated with each other by means of threaded elements, said two components being shaped so as to form, by mutual association, one of said seats for accommodating the corresponding tubular shaped element.

3. The apparatus according to claim 1, wherein each one of said sliding blocks is constituted by perforated blocks which are keyed to said cable and are provided with a seat for accommodating the cutting element.

4. The apparatus according to claim 1, further comprising toothed pinions, at least one whereof is motorized, said cable being stretched between said pinions, said pinions being rotatably coupled to said guiding and supporting structure.

5. The apparatus according to claim 1, wherein said flexible element is constituted by one or more chains.

6. The apparatus according to claim 5, wherein each one of said sliding blocks is constituted by a block which is shaped so as to form, at two of its faces which are mutually opposite along a longitudinal axis, slots through which pins pass upon assembly, said pins engaging corresponding links of said chain.

7. The apparatus according to claim 5, further comprising toothed pinions between which said chain is stretched, said pinions being rotatably supported by said guiding and supporting structure, one of said toothed pinions being motorized.

8. The apparatus according to claim 1, wherein said guiding and supporting element is plate-shaped.

9. The apparatus according to claim 8, wherein said guiding and supporting element is shaped so as to form, along its edge, teeth which are associated, at their free end, with plate-like elements, each plate-like element forming a flange which, by association with the other flanges, forms a sliding track for said sliding blocks.

10. The apparatus according to claim 9, wherein each one of said sliding blocks is shaped so as to form a longitudinal slot which is provided with undercuts with which it couples to the sliding track formed by said plate-like elements.

11. The apparatus according to claim 1, wherein said guiding and supporting element has a circular arc which can vary according to the movement of the supporting structure by which it is supported.

12. The apparatus according to claim 1, wherein said flexible element is moved with a continuous unidirectional movement.

13. The apparatus according to claim 1, wherein said flexible element is moved with a reciprocating motion.

14. The apparatus according to claim 1, further comprising means for coupling to other self-propelled units.

\* \* \* \* \*